US008283580B2

(12) United States Patent
McPhail et al.

(10) Patent No.: US 8,283,580 B2
(45) Date of Patent: Oct. 9, 2012

(54) SYSTEM AND METHOD FOR COUNTING NOMINALLY IDENTICAL ARTICLES BY WEIGHT

(76) Inventors: Duncan McPhail, Kirkcaldy (GB); Neil James Hunter, Limekilns (GB); William Wright Hamilton, Rosyth (GB)

( * ) Notice: Subject to any disclaimer, the term of this patent is extended or adjusted under 35 U.S.C. 154(b) by 426 days.

(21) Appl. No.: 12/311,011

(22) PCT Filed: Sep. 20, 2007

(86) PCT No.: PCT/GB2007/003582
§ 371 (c)(1),
(2), (4) Date: Aug. 18, 2009

(87) PCT Pub. No.: WO2008/035087
PCT Pub. Date: Mar. 27, 2008

(65) Prior Publication Data
US 2009/0301791 A1 Dec. 10, 2009

(30) Foreign Application Priority Data
Sep. 20, 2006 (GB) .................................. 0618484.0

(51) Int. Cl.
*G01G 19/42* (2006.01)
*G01G 23/10* (2006.01)
(52) U.S. Cl. ..................................... 177/25.17; 177/185
(58) Field of Classification Search ............... 177/25.17, 177/185
See application file for complete search history.

(56) References Cited

U.S. PATENT DOCUMENTS

| 3,670,833 | A | * | 6/1972 | Akuta et al. ....................... 177/1 |
| 4,219,089 | A | * | 8/1980 | Gard et al. ..................... 177/165 |
| 4,447,885 | A | * | 5/1984 | Biss ............................... 702/129 |
| 4,512,428 | A | * | 4/1985 | Bullivant .................... 177/25.17 |
| 4,553,619 | A | * | 11/1985 | Fujinaga ........................ 177/185 |
| 4,660,662 | A | * | 4/1987 | Katz ................................ 177/50 |
| 4,782,904 | A | * | 11/1988 | Brock ............................. 177/185 |
| 5,193,629 | A | * | 3/1993 | Lare ............................. 177/25.17 |
| 6,713,689 | B2 | * | 3/2004 | Eaton et al. ................. 177/25.15 |

FOREIGN PATENT DOCUMENTS

GB      2407173      4/2005

* cited by examiner

*Primary Examiner* — Randy W Gibson
(74) *Attorney, Agent, or Firm* — William H. Bollman (57) ABSTRACT

A method and apparatus for counting nominally identical articles employs weighing apparatus, which comprises a load hod (102) for holding a number of articles to be weighed and a load transducer (20) responsive to loading of the hod (102) to produce a derived electrical signal indicative of the apparent weight of articles in the hod (102). The signal is susceptible to fluctuation as a result of local air currents acting on the hod (102) or on the articles contained therein. The transducer derived signal is filtered to extract a component signal representative of such fluctuation. After further processing, the filtered component signal is used to correct the original transducer signal thereby to indicate the true weight of articles in the hod (102). The number of articles in the hod (102) is then determined by dividing the true weight indication by an expected average weight of an article. Fluctuations in the transducer signal due to air currents may also be removed by a system of validation of the signals depending on whether or not they are within range limits based on a running average.

13 Claims, 6 Drawing Sheets

| Input | Stage 1 | Average | Inner Limits | | Stage 2 | Stage 3 |
| --- | --- | --- | --- | --- | --- | --- |
| | | | High | Low | | |
| 0.15 | | | | | | |
| 0.50 | | | | | | |
| 0.75 | 0.75 | 0.750 | 0.850 | 0.650 | 0.75 | |
| 0.90 | 0.90 | 0.825 | 0.925 | 0.725 | 0.90 | |
| 1.05 | 1.05 | 0.900 | 1.000 | 0.800 | | |
| 1.15 | 1.15 | 0.963 | 1.063 | 0.863 | | |
| 1.25 | 1.25 | 1.020 | 1.120 | 0.920 | | |
| 1.40 | | | | | | |
| 1.35 | | | | | | |
| 1.20 | 1.20 | 1.110 | 1.210 | 1.010 | 1.20 | |
| 1.10 | 1.10 | 1.150 | 1.250 | 1.050 | 1.10 | |
| 1.00 | 1.00 | 1.140 | 1.240 | 1.040 | 1.00 | 1.00 |
| 0.90 | 0.90 | 1.090 | 1.190 | 0.990 | | |
| 0.80 | 0.80 | 1.000 | 1.100 | 0.900 | | |
| 0.65 | | | | | | |
| 0.65 | | | | | | |
| 0.75 | 0.75 | 0.910 | 1.010 | 0.810 | | |
| 0.90 | 0.90 | 0.870 | 0.970 | 0.770 | 0.90 | |
| 1.05 | 1.05 | 0.880 | 0.980 | 0.780 | | |
| 1.10 | 1.10 | 0.920 | 1.020 | 0.820 | | |
| 0.95 | 0.95 | 0.950 | 1.050 | 0.850 | 0.95 | |
| 0.90 | 0.90 | 0.980 | 1.080 | 0.880 | 0.90 | |
| 1.10 | 1.10 | 1.020 | 1.120 | 0.920 | 1.10 | 1.10 |
| 0.95 | 0.95 | 1.000 | 1.100 | 0.900 | 0.95 | 0.95 |
| 1.05 | 1.05 | 0.990 | 1.090 | 0.890 | 1.05 | 1.05 |
| 0.95 | 0.95 | 0.990 | 1.090 | 0.890 | 0.95 | 0.95 |
| 1.10 | 1.10 | 1.030 | 1.130 | 0.930 | 1.10 | 1.10 |
| 1.05 | 1.05 | 1.020 | 1.120 | 0.920 | 1.05 | 1.05 |
| 0.95 | 0.95 | 1.020 | 1.120 | 0.920 | 0.95 | 0.95 |
| 1.00 | 1.00 | 1.010 | 1.110 | 0.910 | 1.00 | 1.00 |
| 0.90 | 0.90 | 1.000 | 1.100 | 0.900 | 0.90 | 0.90 |
| 0.95 | 0.95 | 0.970 | 1.070 | 0.870 | 0.95 | 0.95 |
| 1.20 | 1.20 | 1.000 | 1.100 | 0.900 | | |
| 1.25 | 1.25 | 1.060 | 1.160 | 0.960 | | |
| 1.20 | 1.20 | 1.100 | 1.200 | 1.000 | 1.20 | |
| 1.15 | 1.15 | 1.150 | 1.250 | 1.050 | 1.15 | |
| 1.25 | 1.25 | 1.210 | 1.310 | 1.110 | 1.25 | 1.25 |
| 1.20 | 1.20 | 1.210 | 1.310 | 1.110 | 1.20 | 1.20 |
| 1.20 | 1.20 | 1.200 | 1.300 | 1.100 | 1.20 | 1.20 |
| 1.15 | 1.15 | 1.190 | 1.290 | 1.090 | 1.15 | 1.15 |

SYSTEM AND METHOD FOR COUNTING NOMINALLY IDENTICAL ARTICLES BY WEIGHT

FIELD OF THE INVENTION

The present invention relates to a system and method for count by weight correction and more particularly to count by weight correction systems, whereby the effects of air current alterations on a sensitive count by weight apparatus are significantly reduced, removed by filtering or cancelled.

BACKGROUND OF INVENTION

Count by weight machines, for both banknotes and coins, have existed for many years and are in use in banks and retailers all over the world. Accurate and successful counting depends on evaluating note and coin weights under varying conditions. This means not only where there are no air movements but also under non-standard conditions, for example where there may be air currents from fans and air conditioning equipment.

Normally a scale pan or hod, used to collect notes or coins (and indeed even the currency itself by virtue of its surface area), can cause variations in the measured weights and the effect of these air currents causes errors in the measured weights. The effect of these transients slow down evaluation of interpreted weights and even cause errors in the final interpreted weight and computed value making the weigh counting device unreliable or at worst useless.

Traditionally it has been possible to reduce these effects with streamlining or improving the aerodynamics of the weighing system or providing a shield or shroud to enclose the count by weight machine.

The slowing down and inaccuracy caused has long been an operational problem and on the whole has only been resolved by moving the machine to a location where the effect of the air currents is reduced. This has however, not always been easy, particularly in banks, where the machines are required on a constant basis close to a cashier's till.

As a reduction in operating speed and miscounting is undesirable anything that reduces the effect would be attractive solution to the purchaser and user of the machine. To some extent the problem has been mitigated by the arrangement described in our granted UK Patent GB-B-2 270 986.

PRIOR ART

Other systems have also been developed to solve this problem. One such arrangement is described in U.S. Pat. No. 4,860,839 (Reichmuth), which discloses a weighing system, including: a weighing cell which supplies a measurement signal to an Analog-to-Digital Converter (ADC). An interference signal superimposed on the measurement signal is decoupled from a desired signal by shifting its phase by 180°. Similarly U.S. Pat. No. 3,912,029 (Gorman et al) discloses an apparatus for weighing vehicles in motion. The apparatus has a filter circuit for attenuating and alternating a component in the weighing signal and at least partially removing the alternating component. However, the apparatus would not be suitable for weighing items of relatively small mass, such as bank notes.

U.S. Pat. No. 3,670,833 (Akuta Tomohiko et al) discloses a method for measuring a weighing load rapidly. Where a detected load signal has an oscillatory component, this oscillatory component was separated, inverted and superposed on the original to eliminate the oscillatory component.

An example of an electronic balance is described in U.S. Pat. No. 4,782,904 (Brock), which discloses an electronic balance that takes into account the operational conditions of the balance and the filtering level desired by an operator. The operational conditions may have been, for example, the stability of the weighing platform or display, the resolution of the display, or both. Use of the digital filter in this device resulted in a stable display with fast responses to changes in weight.

UK Patent Application GB A 2 076 979 (Perkham Ltd) discloses a device for weighing that generates a warning signal indicating that a reliable signal could not be derived. This device therefore alerts a user to the possibility of an erroneous reading. It does not provide a solution to the problem of overcoming the reasons for the reading.

U.S. Pat. No. 4,512,428 (Bullivant) discloses a device wherein an accurate count of the items was obtained by placing them in incremental groups, such that the net weight of any incremental group of items, needed a stable net weight equal to or below the predetermined threshold weight before a count could be commenced.

GB Patent Application GB A 2 241 065 (Percell Group Ltd) discloses a weighing device that included a microprocessor with associated memory which determined the number and/or value of the weighed items by dividing the weight signal by an appropriate weight factor.

Scales have been developed to weigh items such as letters or envelopes with a view to determining the postage costs. GB Patent Application GB A 2 257 793 (Pitney Bowes Inc) discloses a weighing machine with a validating reference channel that comprised a sensor for providing an output indicative of the instantaneous weight of an article. This was combined with a reference sensor providing an output indicative of instantaneous vibrations affecting the output of the weighing channel.

U.S. Pat. No. 4,553,619 (Fujinaga) discloses an electronic balance with averaging feature for vibration error correction. It displayed a correct weight value by averaging digitised weight data from a weight detector provided in the balance, that was output at predetermined time intervals.

Despite the above being, to varying degrees successful, the problem of the effect of variations in air currents and draughts (for example when a window or door is opened in an office or when an air conditioning system switches on or off) on the extremely sensitive balances, has not been resolved satisfactorily.

The present invention therefore arose in order to overcome this problem and provide a system that is capable of accurately obtaining and discriminating a value from a fluctuating input or series of input signals.

SUMMARY OF THE INVENTION

According to a first aspect of the invention there is provided a method of counting, nominally identical articles, by weighing them in weighing apparatus, which apparatus comprises a load hod for holding a number of articles to be weighed and a load transducer responsive to loading of the hod from which is derived an electrical signal indicative of the apparent weight of articles in the hod, said signal being susceptible to fluctuations, the method comprising the steps of:

taking a series of samples of the transducer derived signal when a number of articles to be determined are loaded in the hod;

determining if each sample is within a predetermined broad range;

calculating a running average value for those samples falling within the broad range;

determining if these samples also fall within a narrower range of the running average value;

accepting samples falling within the narrower range as valid if a predetermined number of such samples occur in succession;

determining a fluctuation independent weight for the loaded articles from the accepted samples; and determining the number of articles in the hod by dividing the fluctuation independent weight by an expected average weight of an article.

As the signal is susceptible to variation, for example as a result of local air currents acting on the hod or on the articles contained therein, the combined effect of two-stage filtering, which also includes a time weighting function, is deemed to provide a higher level of confidence that an output signal is in fact a true representation.

Preferably the method includes the step of calculating the actual limits for each successive sample from a current running average and a predetermined tolerance value.

In a particularly preferred embodiment the predetermined number of sequentially valid samples, within the narrower range necessary for them to be accepted as valid, is three. However, if a greater degree of certainty is required then the predetermined number of valid samples could be four, five or any other number. In practice the higher the number of sequentially valid samples required imposes greater burdens on a counter (which could be a part of a micro-processor) as more calculations are required. However, as micro-processors become faster and more powerful, and samplers are able to provide a greater number of input signals at higher and higher frequencies, very precise measurements can be obtained in what were previously unsuitable ambient conditions.

Ideally the invention can be incorporated into new weighing machines or apparatus or it may be retro-fitted to existing apparatus, either as a retrofit feature or in the form of software or firmware. For example, an algorithm employing the necessary steps could be embodied in software and stored on Erasable Programmable Read Only Memory (EPROM) or Electronically Erasable Programmable Read Only Memory (EEPROM) or supported on a Field Programmable Gate Array (FPGA) or similar device.

Alternatively, or further preferably, the system incorporates a digital filter that comprises a plurality of filtering stages, each of which helps eliminate non-valid measured values, where two sets of limits are used and in which outer or upper limits (which are fixed) are employed to recalculate inner (or lower) limits. This helps determine what the true, real weight variations are that are caused by additional currency being put on or taken off the hod and to differentiate these variations from variations in ambient conditions.

This technique may be enhanced by use of a running average to set narrow limits.

Preferably, the system incorporates an algorithm that correlates present note weights and allows a band of acceptable and unacceptable note weights by calculation or by reference to a look up table.

Preferably, the system incorporates an algorithm that tracks a zero reference point, where no currency is present in the hod.

In a particularly preferred embodiment, a tracking system may be used to compensate for drift effects within electronic components and circuits caused by temperature changes.

Ideally the system incorporates a means to compensate for changes in banknote weights caused by humidity and dirt impregnation effects.

Preferably the system has a means to detect boundaries of correct multiples of note weights and note weights that are not admissible as reasonable correct weights.

According to another aspect of the invention there is provided a method of counting nominally identical articles by weighing them in weighing apparatus which comprises: a load hod for holding a number of articles to be weighed and a load transducer responsive to loading of the hod from which is derived an electrical signal indicative of the apparent weight of articles in the hod, said signal being susceptible to fluctuations acting on the hod or on the articles contained therein, the method comprising the steps of:

filtering the transducer derived signal to extract a component signal representative of such fluctuation;

processing the filtered component signal;

using the processed component signal to correct the original transducer signal thereby to indicate the true weight of articles in the hod; and determining the number of articles in the hod by dividing the true weight indication by an expected average weight of an article.

As a result of the correction by way of the processed component signal representative of the fluctuation, the weighing apparatus operates as effectively in a transient state as it does in a static or stable state.

The digital signal is then ideally processed to remove transient effects, such as are attributable to air conditioning systems and the result is a fast, accurate measurement and display of the results.

Either aspect of the invention may be combined with, for example, a low pass and other electronic filters may be used to remove relatively high frequency signals attributable to air current fluctuations from the transducer signal. Once removed a DC component signal is present as the true weight measurement Preferably the system incorporates a means for detecting an underlying air current effect for subsequent negation.

BRIEF DESCRIPTION OF DRAWINGS

Embodiments of the present invention will now be described, by way of example only, with reference to the drawings, in which.

This invention provides a method whereby response time is fast and the computed result is accurate

DETAILED DESCRIPTION OF PREFERRED EMBODIMENTS

Figure 1:
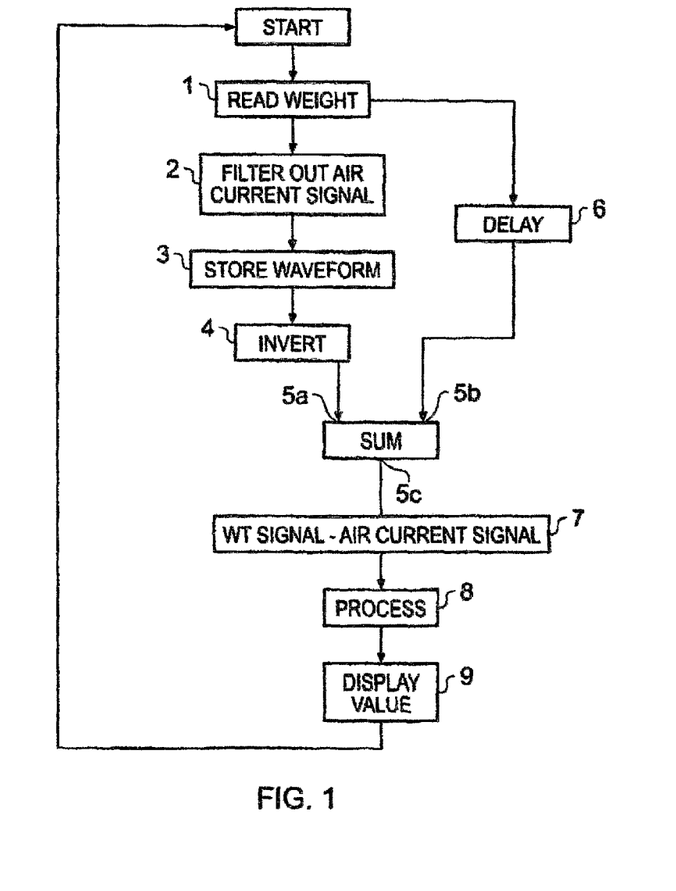
FIG. 1 illustrates a flow diagram representing the process required for one embodiment of the present invention.

Referring to FIG. 1, there is shown an example system according to one aspect of the present invention in which a weight of a hod and contents is applied, in the form of an INPUT signal, at the START and is read at READ BOX 1. An air current component part of the signal is filtered electronically, eg by suitable band pass filters, and this is detected at FILTER 2. A digital representation of the signal is stored in STORE 3. The stored signal is then inverted by INVERTER 4 and summed at an ADDER 5.

The same signal that was output from READ 1 is subjected to a variable delay at DELAY 6 and passes to the port 5b of ADDER 5. ADDER 5 produces a combined output signal at 5c. The resultant combined output signal is the total weight INPUT signals indicative of the total weight of hod and any currency contained in it (see FIG. 2). The value of any air current effects are subtracted from the output signal by the AIR CURRENT SIGNAL 7, thereby providing a clean or total weight signal can then be processed, by PROCESSOR 8 for conversion into a computed value for the currency on the hod.

Figure 2:
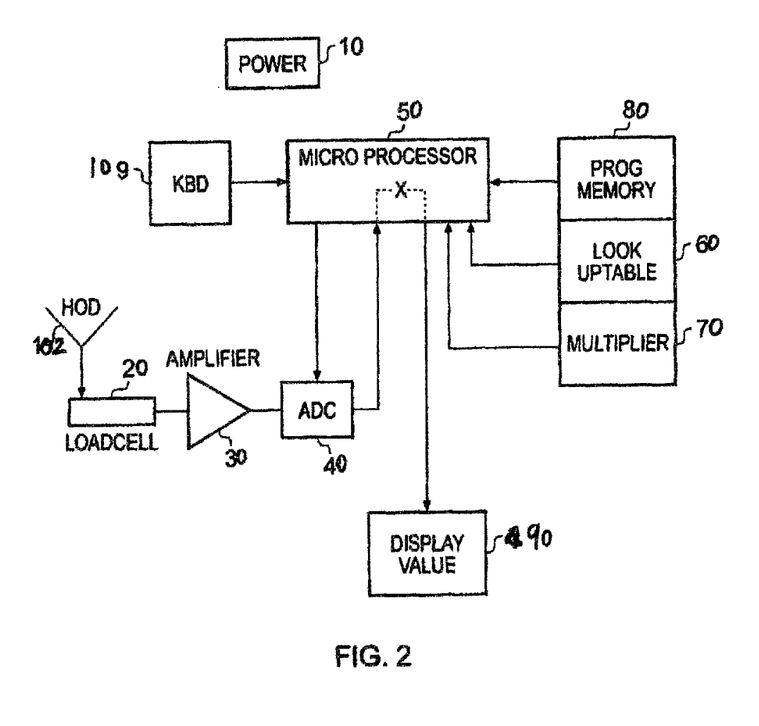
FIG. 2 illustrates, in diagrammatical form, one embodiment of a system for displaying an output value of the currency on the note hod.

Air current effects can be filtered by use of a low pass filters (or pass filters passing higher frequency components of the signal) which are then fed back to error detectors, in opposite phase, so as to cancel out the effect of the air currents and allow further digital processing to compute value of the currency on the hod without errors Referring now to FIG. 2, an embodiment of a system for weighing currency is shown and in which the invention is embodied. A note or coin hod 10 connects to a load cell device 20 which is a transducer that converts weight into an electrical signal that is then passed to amplifier 30. Amplifier 30 presenting its output to an Analogue-to-Digital Converter (ADC) 40. The resultant digital output is then capable of being processed by a microprocessor 50 that scales and compares the signal with values of notes or coins derived typically from a Look-Up TABLE 60 using multipliers 70.

The processing operation is controlled by software operating in the form of a suitable program and stored in memory 80 before being displayed by display 90. Operational functionality is controlled by keyboard unit 109 and an Uninterrupted Power System (UPS) yields mains powered or battery portable operation when required.

Figure 3:
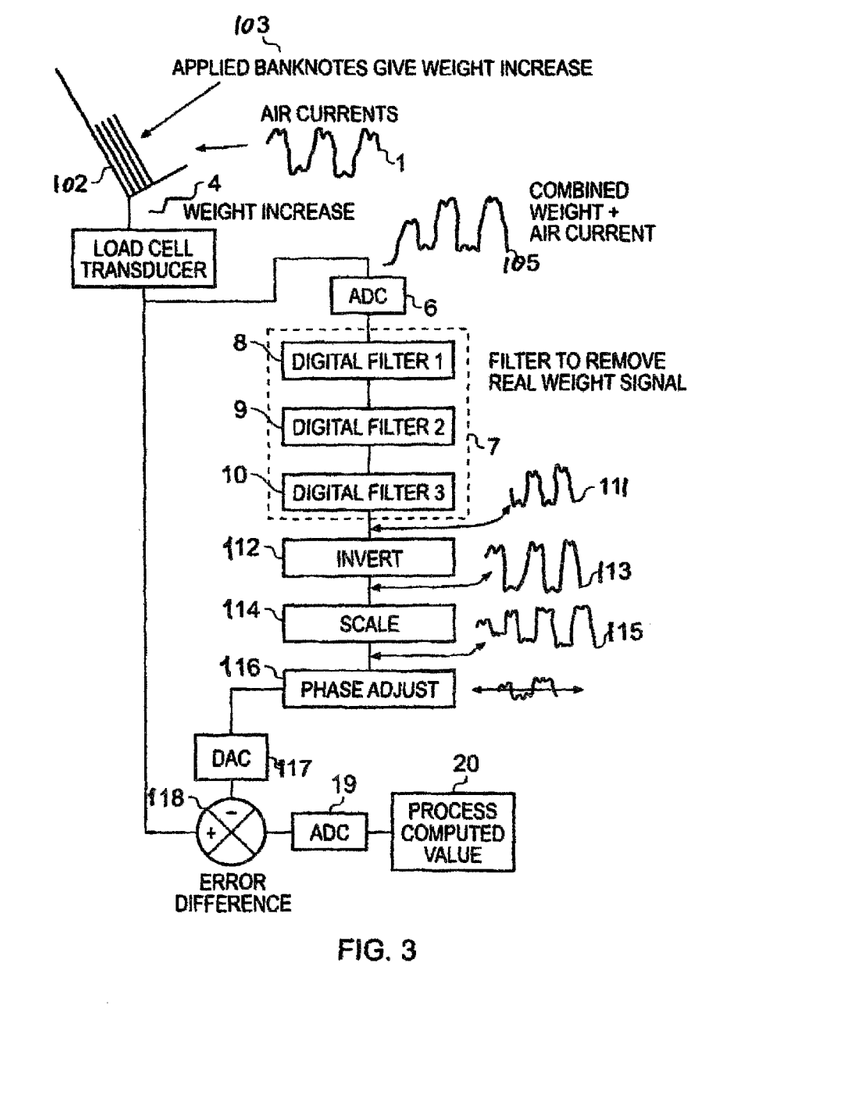
FIG. 3 illustrates an alternative to the embodiment shown in FIG. 1 and shows a typical series of waveforms derived from a transducer, and in diagrammatic form, shows the relationship between hardware, digital filtering and how by scaling, inversion and phase adjustment signals are manipulated to cancel the effect of air currents.

FIG. 3 is an alternative to the embodiment shown in FIG. 1. Where the embodiment in FIG. 1 introduces a forced delay into the transducer signal and then inverts the filtered signal, the embodiment shown in FIG. 3 does not introduce any delay in the main transducer signal path but uses phase shifting in addition to inversion in the filtered signal path. Referring specifically to FIG. 3, there is shown a representation of several typical input signals—in the form of waveforms—which are received from transducer 20. Air current movements impinge on the note hod 102 but also on any banknotes 103 that may be present or applied to the hod 102. This gives rise to a true weight increase 104 that is combined with air current signal to produce effectively a false signal 105.

Existing filtering techniques enable the system to avoid treating the true weight step function 104 as an air current fluctuation by way of removing such duplicate signals digitally. The corrected signal is then input to Analogue-to-Digital Converter 106 and then to multi-stage filter 107, which is described in greater detail below. Multi-stage filter 107 filters only the air current effects for later use in cancellation.

The combined effect of multi-stage filter 107 is to produce at its output, a signal 111 that is the signal we require to use in the negation process. In order to do this correctly the signal is inverted in box 112 producing waveform 113, scaled in box 114 producing signal 115 that is then phase adjusted by PHASE ADJUSTER 116 and converted back to an analogue signal by Digital-to Analogue Converter (DAC) 117. The analogue signal is fed to an error difference detector 118 whose output is a signal that represents the real weight increase. This signal is in turn applied to ADC 119 to be processed and computed by box 120 as a value that may be indicated on a display.

Figure 4:
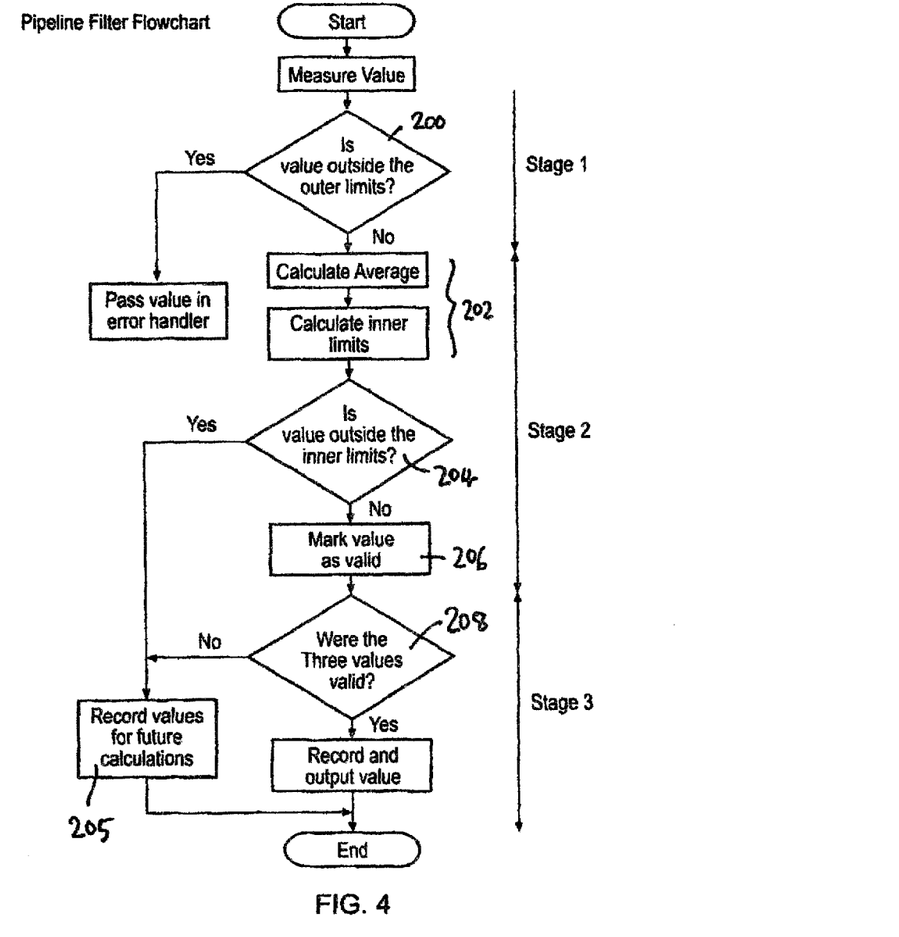
FIG. 4 illustrates a typical flowchart of a filter system according to a further alternative embodiment of the invention, and shows a filter system for retrieving an actual weight signal from a combined air current and weight signal.

FIG. 4 illustrates a typical flowchart of a filter system according to a further alternative embodiment of the invention, and shows a filter system for retrieving an actual weight signal from a combined air current and weight signal and is hereinafter referred to as a pipeline filter. The pipeline filter may be used to output only the true signal, derived form a signal that includes the combination of an 'air effects' signal and an actual weight signal.

Referring to FIG. 4, Stage 1 of the pipeline filter compares measured values, which may be sampled typically in excess of 10-20 Hz, with preset outer limits that are established around known integer multiple values of an ideal unit measurement. These preset limits may be either input by a user, selected according to a scale of confidence or probability (eg ±P standard deviations) or calculated in real time.

For example if the units to be measured are bank notes, each weighing 1.0 g, the outer limits could be (0.7 g, and 1.3 g), or (1.7 g and 2.3 g) or (2.7 g and 3.3 g). Thus, as is apparent from decision box 200 in FIG. 4, only input values that are detected within a particular pair of outer limits are passed to the next stage 202 of the pipeline filter. Any detected samples, falling outside the outer limits pass to a separate algorithm for handling errors. Furthermore it is understood that the closer the higher and lower values of the outer limits are one to another, the more selective is Stage 1 of the pipeline filter.

Stage 2 calculates a running average of values passed from stage 1 and selects values for inner limits around this average. Again the inner limits may be input by a user, selected according to a scale of confidence or probability (eg ±Q standard deviations) or calculated in real time. However, it is worth noting that the inner limits are closer together than the limits used in Stage 1. Thus using the aforementioned example of banknotes, if the calculated running average was 1.05 the inner limits could be (0.95 g, 1.15 g). Any values outside the inner limits, as specified at decision box 204, are rejected, but are nonetheless recorded for calculation of future running averages at 206.

A practical benefit of this is that any values that change suddenly within the limits of stage 1 (eg due to a draught) are invalidated—ie do not form part of a time-based average—but if the measured value settles after this transient values quickly become valid again.

Stage 3 checks for consistency, by monitoring the number of consecutive valid outputs from stage 2. When a value is identified by stage 2 as being invalid stage 3 flags this at 206. Decision box 208 prevents any value to be considered valid until an identified number (N) of sequential values are shown to be valid without interruption. The number N can be varied. The greater the value if N the higher the expected consistency that is required by the measurements in order to provide a valid signal. The value of N can be selected according to a particular industry standard or a statistical model of acceptable risk/error.

Thus if a measured value and its previous value were both filtered as valid, by stage 2, and a third successive value is flagged as invalid, stage 3 rejects the invalid value, even though it has been preceded by (N−1) valid values. However, if a next value were marked as valid by stage 2, the stage 3 marks this new value as a valid one and this process continues until an invalid value is obtained. The result is that a consistency check is performed which checks for, in this instance for at least 3 consecutive valid values (N=3). The result is that stage 3 provides output signals as appearing in the third column on FIG. 5.

Figure 5:
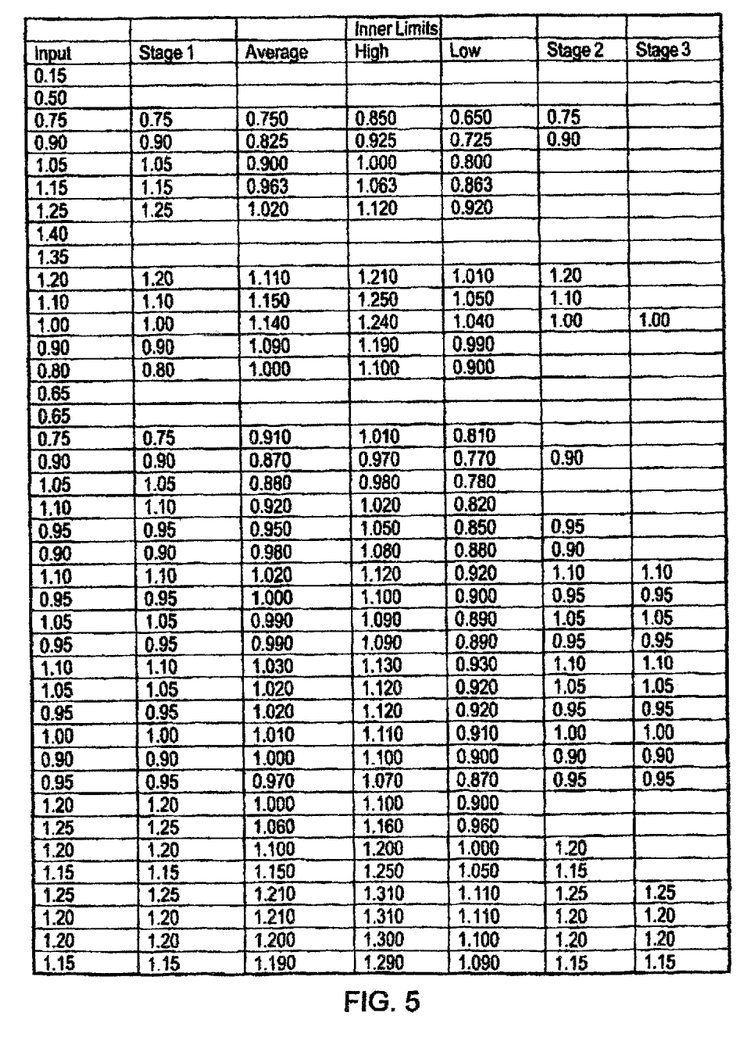
FIG. 5 is a TABLE showing typical values derived using the filter arrangement of FIG. 4 and gives examples of Outer and Inner limits and how these relate to Average Values and Final Output Values.

FIG. 5 is a table of typical values used by the pipeline filter and the response each stage has to them for outer limits of +/−0.3 about the theoretic (true) weight, inner limits of +/−0.1 (around the running average) and N=3 consecutive measurements.

Figure 6:
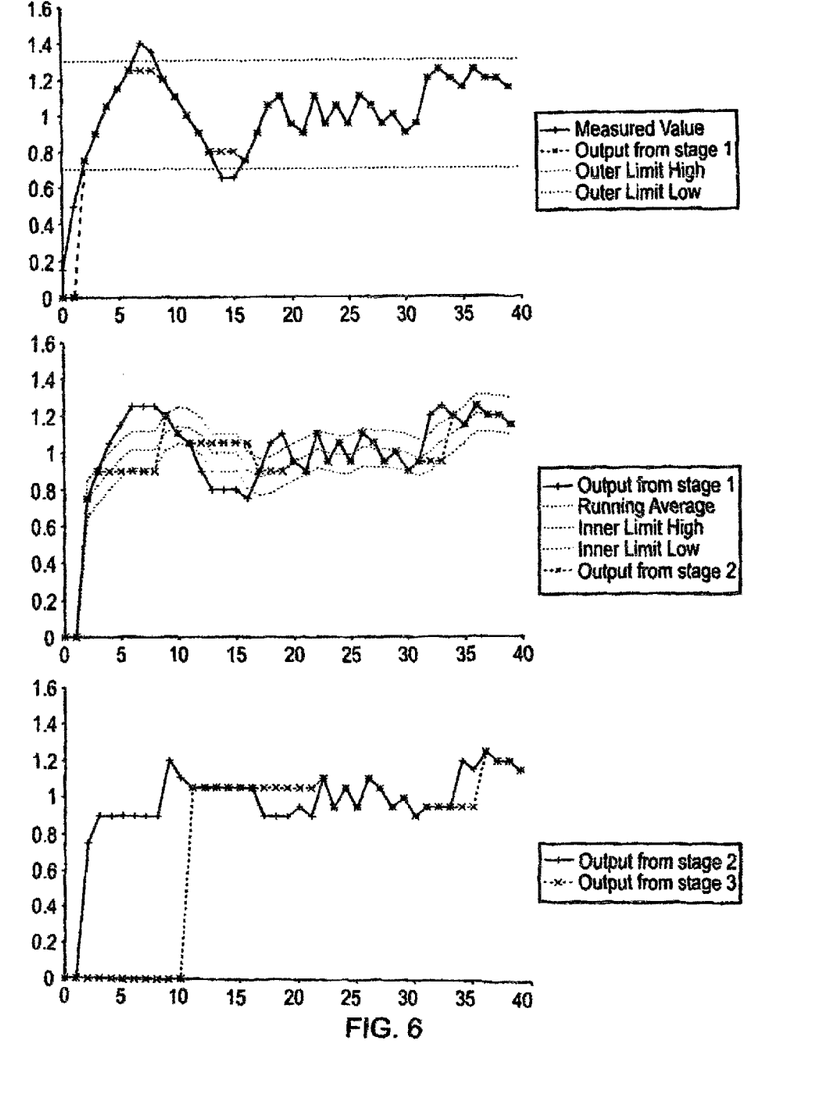
FIG. 6 is a set of graphs of typical waveforms filtered by the filter whose values correspond to the data in the TABLE.

FIG. 6 is a set of graphs showing the results from each stage using the data derived from FIG. 5.

Improvements and modifications may be incorporated without departing from the scope of the present invention.

The invention claimed is:

1. A method of counting nominally identical articles by weighing them in weighing apparatus, which apparatus comprises a load hod for holding a number of articles to be weighed and a load transducer responsive to loading of the hod from which is derived an electrical signal indicative of an apparent weight of articles in the hod, said electrical signal being susceptible to fluctuations acting on the hod or on the articles contained therein, the method comprising steps of:
    taking a series of samples of the load transducer derived electrical signal when a plurality of articles to be counted are loaded in the hod;
    calculating a running average value for those of said series of samples falling within a predetermined broad range;
    accepting those of said series of samples falling within a narrower range of the calculated running average value as valid when a predetermined number of such samples occur in succession;
    determining a fluctuation independent weight for the loaded articles from the accepted valid samples; and
    determining a number of articles in the hod by dividing the fluctuation independent weight by an expected average weight of an article.

2. A method as claimed in claim 1 including the step of calculating actual limits for each successive sample from a current running average and a predetermined tolerance value.

3. A method as claimed in claim 1 in which the predetermined number of samples within the narrower range necessary for them to be accepted as valid is three.

4. A method of counting nominally identical articles by weighing them in weighing apparatus, which apparatus comprises a load hod for holding a number of articles to be weighed and a load transducer responsive to loading of the hod from which is derived an electrical signal indicative of the apparent weight of articles in the hod, said signal being susceptible to fluctuation as a result of local air currents acting on the hod or on the articles contained therein, the method comprising the steps of:
    filtering the transducer derived electrical signal to extract a component signal representative of such fluctuation;
    processing the filtered component signal;
    using the processed component signal to correct the transducer derived electrical signal thereby to indicate a true weight of articles in the hod; and
    determining a number of articles in the hod by dividing the true weight indication by an expected average weight of an article.

5. A method as claimed in claim 4 in which said processing step inverts the filtered component signal.

6. A method as claimed in claim 5 in which the transducer derived electrical signal is delayed by a fixed amount and said using step subtracts the inverted filtered component signal from the delayed signal.

7. A method as claimed in claim 4 in which said processing step further includes the steps of scaling and phase adjusting the inverted filtered component signal and said using step subtracts the phase adjusted filtered component signal from the transducer derived signal.

8. A method as claimed in claim 7 which the transducer derived electrical signal is analog and includes the step of converting the transducer derived signal to digital form, said filtering, inverting, scaling and phase adjusting steps all being performed digitally, and further includes the step of converting the phase adjusted digital signal to analog form for subtraction from the transducer derived electrical signal.

9. Article counting apparatus for counting nominally identical articles, comprising:
    a load hod for holding a plurality of articles to be counted;
    a load transducer responsive to loading of the hod to produce a derived electrical signal indicative of an apparent weight of articles in the hod, said transducer derived electrical signal being susceptible to fluctuation as a result of local air currents acting on the hod or on the articles contained therein;
    filter means for filtering the transducer derived electrical signal to extract a component signal representative of such fluctuation;
    processing means for processing a filtered component signal, said processing means including an inverter to invert the filtered component signal;
    correction means arranged to use the processed component signal to correct the transducer derived electrical signal thereby to indicate a true weight of articles in the hod; and
    count computing means arranged to determine a number of articles in the hod by dividing the true weight indication by an expected average weight of an article.

10. The article counting apparatus for counting nominally identical articles according claim 9 including a delay means for delaying the transducer derived signal by a fixed amount and said correction means is arranged to subtract the inverted filtered component signal from the delayed signal.

11. The article counting apparatus for counting nominally identical articles according to claim 10 in which said processing means further includes scaling means and phase adjusting means for scaling and phase adjusting the inverted filtered component signal respectively and said correction means is arranged to subtract the phase adjusted filtered component signal from the transducer derived signal.

12. The article counting apparatus for counting nominally identical articles according to claim 11 in which the transducer derived signal is analog and which includes an analog to digital converter for converting the transducer derived signal to digital form, said filter means, inverter and phase adjusting means all being digital, and which further includes a digital to analog converter for converting the phase adjusted digital signal to analog form for subtraction from the transducer derived electrical signal by said correction means.

13. Article counting apparatus for counting nominally identical articles, comprising:
    a load hod for holding a plurality of bank notes to be counted, the load hod being adapted to hold a stack of such bank notes;

a load transducer responsive to loading of the hod to produce a derived electrical signal indicative of an apparent weight of bank notes in the hod, said transducer derived electrical signal being susceptible to fluctuation as a result of local air currents acting on the hod or on the bank notes contained therein;

filter means for filtering the transducer derived electrical signal to extract a component signal representative of such fluctuation;

processing means for processing a filtered component signal;

correction means arranged to use the processed component signal to correct the transducer derived electrical signal thereby to indicate a true weight of bank notes in the hod; and count computing means arranged to determine a number of bank notes in the hod by dividing the true weight indication by an expected average weight of a bank note.

* * * * *